3,082,822
SECONDARY RECOVERY WATER-
FLOOD PROCESS
Le Roy W. Holm and George G. Bernard, Crystal Lake, Ill., assignors to The Pure Oil Company, Chicago, Ill., a corporation of Ohio
No Drawing. Filed Nov. 19, 1959, Ser. No. 854,007
6 Claims. (Cl. 166—9)

This invention relates to improving the efficiency of mineral oil production from subterranean reservoirs by secondary recovery methods. It more specifically relates to the use of oil-soluble solvents and oil-soluble surface-active agents for modifying the interfacial tension relationships that exist in a reservoir system during a water-flood secondary recovery process.

The addition of surfactants to floodwater used in secondary recovery of petroleum is well known, but such practice has not gained widespread acceptance because of the relatively small increases in oil production realized in actual practice. The efficiency of the prior art methods appears to be at least partially due to the fact that the connate water contained in the reservoir tends to build up as a bank ahead of the surfactant-containing water. This prevents contact of the floodwater with the oil bank which develops ahead of the displaced connate water. Consequently, the benefits to be gained by lowering the interfacial tension between the oil and floodwater is not realized at the interface between the oil and floodwater where it is most needed. Attempts to inject the surfactant directly into the reservoir have had little, if any, success, probably because of the small area of contact between the surfactant and the reservoir oil.

The use of surfactants has been even more inefficient because of the high losses of surfactant through adsorption on the formation surfaces, principally in water-wet formations. Because the surfactant is introduced in solution in the floodwater, the surfactants proposed heretofore have been water-soluble. In general, this loss to the reservoir rock has prevented the use of surfactants in actual water-flood operation because of the uneconomically large quantities of surfactant required to realize an increase in oil recovery. The prior art has recognized that an advantage can be gained by injecting a small quantity of an oil-soluble solvent, such as a liquefied petroleum hydrocarbon, ahead of the floodwater. While such methods result in a substantial improvement in oil recovery, a large proportion of the oil in the reservoir still remains unrecoverable.

It is an object of this invention to provide an improved secondary recovery process for the production of petroleum oil from underground reservoirs.

Yet another object of this invention is to provide an improved method for introducing surface-active agents into a petroleum-containing reservoir.

Another object of this invention is to provide an improved method by which surface-active material can be maintained in effective amounts at the interface between the petroleum oil and the floodwater in a secondary recovery process.

Still another object of this invention is to provide a method by which predominantly oil-soluble surfactants may be utilized in secondary recovery processes.

The process of this invention consists of injecting into the oil-bearing reservoir a small amount of an oil-soluble surfactant dissolved in a solvent which is substantially less viscous than the reservoir oil, miscible with the oil, and substantially insoluble in the reservoir water and floodwater. This solvent is driven through the reservoir toward at least one producing well by the injection of floodwater through the same well through which the solvent was introduced into the reservoir. The low-viscosity solvent, having an unfavorable viscosity and mobility ratio with respect to the petroleum in the reservoir, fingers and diffuses ahead of the floodfront through a large portion of the reservoir oil, and distributes the dissolved surfactant throughout this oil, making the surfactant available at the water-oil interference during the subsequent water-flooding step. At the same time, the solvent in which the surfactant is dissolved establishes a continuous oil phase at the floodfront and reduces the viscosity of the petroleum oil with which it mixes so as to produce a favorable mobility ratio between this oil and the after-injected floodwater.

The introduction of the surfactant in solution in the solvent makes possible the use of surfactants which are predominantly oil-soluble, and only slightly soluble or insoluble in the floodwater. Thus, when the method of this invention is practiced in water-wet formations, the loss of surfactant to the reservoir rock by adsorption is negligible because the solvent is immiscible with water and consequently does not contact the water-wet surfaces of the rock. Moreover, the surfactant itself, being predominantly oil-soluble, does not tend to cling to the water-wet rock surfaces. This greatly reduces the loss of surfactant by adsorption on the surfaces of the rock and permits the use of much smaller quantities of surfactant. This leads to a very marked advantage over the prior art methods of using water-soluble surfactants dissolved in the floodwater.

Various solvents having the aforenamed characteristics may be used with the method of this invention. Preferred are the lighter hydrocarbons and petroleum fractions, such as propane, butane, pentane, hexane, LPG, natural gasoline, petroleum naphthas, kerosene, and mixtures of the aforenamed hydrocarbons. Numerous commercially available surfactants may be used with the method of this invention. Suitable surfactant materials are set out in Table I, which shows the trade name, chemical composition, and manufacturing company for each surfactant listed.

Table I

| Trade Name | Chemical Composition | Company |
|---|---|---|
| Span 20 | Sorbitan Monolaurate | Atlas. |
| Span 40 | Sorbitan Monopalmitate | Do. |
| Span 85 | Sorbitan Trioleate | Do. |
| Tween 65 | Polyoxyethylene Sorbitan Tristearate. | Do. |
| Tween 81 | Polyoxyethylene Sorbitan Monooleate. | Do. |
| OPE 1 | Octylphenoxyethanols | Rohm and Haas. |
| OPE 2 | do | Do. |
| OPE 3 | do | Do. |
| Triton GR-7 | Dioctyl Sodium Sulfosuccinate | Do. |
| Triton B-1956 | Modified Phthalic Glycerol Alkyl Resin. | Do. |
| Triton X-45 | Isooctyl phenyl polyethoxy ethanol (about 5 ethoxy groups per molecule). | Do. |

In general, the solvent, which must be miscible with the reservoir oil, but be substantially insoluble in water, must have a viscosity which is appreciably lower than the viscosity of the petroleum contained in the reservoir, and preferably is at least 20% lower in viscosity than the petroleum oil. The volume of the surfactant-containing solution injected should be greater than about 0.005 reservoir pore volume, and may be as high as 0.200 or more, but large volumes become uneconomical except under very unusual circumstances. The surfactant must be much more soluble in the reservoir oil than in the reservoir water, and preferably is soluble in the solvent to at least 0.5% by volume. The actual amount of surfactant contained in solution can be as low as 0.1%, with the upper limit being primarily dependent upon economic considerations. In practicing this invention, it is preferred to inject about 0.02 to 0.06 reservoir pore volume of the solvent in which is dissolved 1 to 3% by volume of the selected surfactant.

The effectiveness of the method of this invention was demonstrated by various experiments performed using sandstone cores. In the first set of experiments, two Berea sandstone cores 2" x 2" x 12" long were saturated with West Texas crude oil and connate water containing 1.5% dissolved salts. Core No. 1 contained 0.69 pore volume crude oil and 0.31 pore volume connate water. Core No. 2 contained 0.68 pore volume crude oil and 0.32 pore volume connate water. Both cores were then driven to residual oil saturation by the injection of water in which was dissolved 1.5% salt. Both cores retained a residual oil concentration of 0.24 pore volume. Core No. 1 was then produced by the injection of 0.10 pore volume of hexane followed by water containing 1.5% salt. Core No. 2 was produced in an identical manner. The results obtained are set out in Table II.

Table II

| Core No. 1 | | Core No. 2 | |
|---|---|---|---|
| Total Fluid Injected | Oil Recovered | Total Fluid Injected | Oil Recovered |
| 0.27 | 0.100 | 0.22 | 0.050 |
| 0.33 | 0.120 | 0.30 | 0.100 |
| 0.80 | 0.131 | 0.61 | 0.116 |
| 1.00 | 0.133 | 1.00 | 0.128 |

In each case the figures refer to core pore volumes. The data are presented to show the increased recoveries which can be realized by using an oil-miscible solvent ahead of a water drive, and to establish a basic of comparison with the method of this invention. Further, the data are presented to establish a parameter for the comparison of recoveries obtainable from the two cores. This will permit comparison of the data obtained in subsequent tests upon the same two cores and set out in Table III. It has been found that once a core has been used in a surfactant-treatment process, it is impossible to remove all of the surfactant from the rock surfaces, and therefore no further tests can be conducted on the core without the introduction of errors resulting from the presence of the surfactant on the core rock surfaces. In order to compare meaningfully two processes which utilize surfactants in the production of oil, it is necessary to use separate cores, but first it is necessary to conduct tests which will establish the similarity of the cores themselves and thus establish a basis for the comparison of the results obtained in the experiments in which surfactant materials are used. Table II provides such a basis.

After the experiments set out in Table II were concluded, the two cores were again resaturated with oil and connate water and redriven to residual oil saturation. Both cores were found again to have a residual oil saturation of 0.24 pore volume. Core No. 1 was then produced by the injection of 0.10 pore volume of hexane in which hexane was dissolved 10% by volume of Triton X-45 surfactant. The hexane-surfactant solution was driven through the core by the injection of water containing 1.5% salt. Core No. 2 was produced by the injection of 0.10 pore volume of hexane. The hexane was driven through the core by the injection of water containing 1.5% salt and 1% by volume of Triton X-100, a water-soluble surfactant. The results of these experiments are set out in Table III. Again the figures refer to core pore volumes.

Table III

| Core No. 1 | | Core No. 2 | |
|---|---|---|---|
| Total Fluid Injected | Oil Recovered | Total Fluid Injected | Oil Recovered |
| 0.34 | 0.125 | 0.30 | 0.110 |
| 0.43 | 0.140 | 0.43 | 0.120 |
| 0.57 | 0.152 | 0.57 | 0.138 |
| 0.85 | 0.175 | 0.73 | 0.150 |
| 1.00 | 0.176 | 1.00 | 0.159 |
| | | 1.43 | 0.178 |

From examination of Table III, it is evident that the recovery of oil from Core No. 1 proceeded at a much more rapid rate. The core was driven to residual oil saturation with the recovery of about 0.175 pore volume of oil and the injection of 0.85 pore volume of total fluids. Beyond this point, practically no oil could be produced. On the other hand, Core No. 2 was not driven to residual oil saturation until 1.43 pore volumes of total fluids had been injected. The total oil recovered using each of these processes was substantially the same. The advantage of producing the oil with the injection of smaller quantities of fluid is obvious. First of all, the oil is recovered in a shorter period of time. More important, the cost of injecting the floodwater is greatly reduced since less water need be injected, and further, recovery of the oil is more economical since the oil is produced at more favorable water-to-oil ratios at the producing well. Further, using the method of this invention, the same amount of oil can be recovered using a somewhat smaller quantity of surfactant. Equal volumes of surfactant had been injected when, in the experiment performed upon Core No. 2 1.10 pore volumes of total fluid had been injected. At this point, the probable total oil recovery from Core No. 2 was about 0.165 pore volume, considerably less than 0.175 pore volume recovered from Core No. 1 with the injection of only 0.85 pore volume of total fluids. The superiority of the method of this invention over an equivalent process in which a water-soluble surfactant is used and dissolved in the floodwater is thus demonstrated.

The advantages of the method of this invention have been further demonstrated experimentally by flooding a sandstone core previously saturated with oil and then water-flooded to residual oil, at which time the water-to-oil ratio was 100 to 1. The results of these experiments are listed in Table IV. These floods were conducted at 750 p.s.i.g. inlet pressure at a 125° F. The core was 3½" in diameter and 7½ feet long.

Table IV

| | Cumulative Oil Recovery, Percent of Oil in Place | | | |
|---|---|---|---|---|
| | Oil Initially In Place Pore Volume | At 0.6 Pore Vol. Throughput | At 1.0 Pore Vol. Throughput | At 2.0 Pore Vol. Throughput |
| Water, Flood | 0.258 | 0.1 | 0.2 | 0.4 |
| Propane slug followed by water (3% P. V. propane) | 0.258 | 28.4 | 29.8 | 30.5 |
| Propane slug containing Triton X-45 followed by water (3% P.V. propane containing 1.2% Triton X-45) | 0.258 | 29.9 | 34.4 | 40.2 |

It is evident that the marked superiority of the method of this invention is applicable using relatively small volumes of solvent and low concentrations of surfactant dissolved in the solvent. However, where lower concentrations of surfactant are used, the oil recovery is not as rapid, that is, greater volumes of floodwater must be injected.

As a specific example of the method of this invention, a subterranean petroleum-containing reservoir, which has undergone primary depletion, is subjected to a secondary recovery process in which 0.04 pore volume of a liquefied petroleum hydrocarbon, comprising $C_3$ to $C_6$ paraffinic hydrocarbons in which is dissolved 2% by volume of Triton X-45 surfactant, is injected through an input well into the reservoir. This solvent is driven through the reservoir toward a producing well by the injection of floodwater. Reservoir fluids are produced from the reservoir through a producing well until the water-to-oil ratio at the producing well reaches an uneconomically high level.

The embodiments of the invention in which an exclusive property or privilege is claimed are defined as follows:

1. A method for recovering petroleum oil from a subterranean reservoir comprising injecting through an input well and into said reservoir a quantity of liquid hydrocarbon solvent equivalent to 0.005 to 0.20 reservoir pore volume, said solvent being miscible with the petroleum oil, substantially insoluble in water, having a viscosity at least 20% lower than the viscosity of said petroleum oil, and containing in solution about 0.1 to about 3.0% by volume of a liquid surfactant which is soluble in said petroleum oil and substantially insoluble in water, injecting floodwater through said input well and into said formation to drive said solvent therethrough toward a producing well, and recovering reservoir fluids from said producing well.

2. A method according to claim 1 in which said solvent comprises a lower-boiling petroleum fraction.

3. A method according to claim 2 in which the quantity of solvent injected is 0.02–0.06 reservoir pore volume.

4. A method according to claim 3 in which said solvent contains in solution 1–3% by volume of surfactant.

5. A method according to claim 4 in which said solvent consists essentially of liquefied paraffinic hydrocarbons having 3 to 6 carbon atoms.

6. A method according to claim 5 in which said surfactant is an isooctyl phenyl polyethoxy ethanol having about 5 ethoxy groups per molecule.

References Cited in the file of this patent
UNITED STATES PATENTS

| | | |
|---|---|---|
| 2,669,306 | Teter et al. | Feb. 16, 1954 |
| 2,800,962 | Garst | July 30, 1957 |
| 2,812,817 | Sayre | Nov. 12, 1957 |
| 2,875,830 | Martin | Mar. 3, 1959 |
| 2,875,831 | Martin et al. | Mar. 3, 1959 |